United States Patent [19]

Lang

[11] 4,047,793

[45] Sept. 13, 1977

[54] POLYGON SCANNER WITH AN ANNULAR LIP

[75] Inventor: John M. Lang, Dallas, Tex.

[73] Assignee: Xerox Corporation, Stamford, Conn.

[21] Appl. No.: 675,101

[22] Filed: Apr. 9, 1976

[51] Int. Cl.² ............................................. G02B 27/17
[52] U.S. Cl. ......................................................... 350/7
[58] Field of Search .................. 350/7, 6, 285; 178/7.6

[56] References Cited

U.S. PATENT DOCUMENTS 2,113,411  5/1938  Schiller .................................. 178/7.6

FOREIGN PATENT DOCUMENTS 502,696  3/1939  United Kingdom .................. 178/7.6

Primary Examiner—Jon W. Henry
Attorney, Agent, or Firm—Sheldon F. Raizes

[57] ABSTRACT

A scanning polygon assembly is provided which comprises a plurality of identical facet blocks arranged in abutting relationship on a platform. The platform has an annular lip against which two corners of each block abut so the facets form chords along the lip to form a polygon. The abutting relationship between the blocks is a tight fit but not a forced fit in order that the blocks are free enough to allow the corners to engage the lip (and thus assure such engagement) due to the centrifugal force exerted thereon during rotation of the polygon.

9 Claims, 6 Drawing Figures

POLYGON SCANNER WITH AN ANNULAR LIP

DESCRIPTION OF THE INVENTION

A normal method employed to manufacture optical scanning polygons is to take a block of metal, mount the same on a fixture and thereafter cut with a cutting tool a plurality of facets on the polygon one at a time. After one facet is cut, the block is rotated to bring a new portion of the block in line with the cutting tool, and a new facet is cut. The chance for error increases each time the block must be rotated. These errors take the form of facet-to-facet angle error and, obviously, the greater the number of facets on a polygon, the greater the accumulative error can become.

It is an object of this invention to economically contruct a polygon in such a manner that the facet-to-facet angle error is substantially reduced thereby enabling one to manufacture polygons with tighter tolerances than previously achieved.

It is another object of this invention to construct a polygon in a simple and inexpensive manner.

Other objects of this invention will become apparent from the following description wherein.

Figure 1:
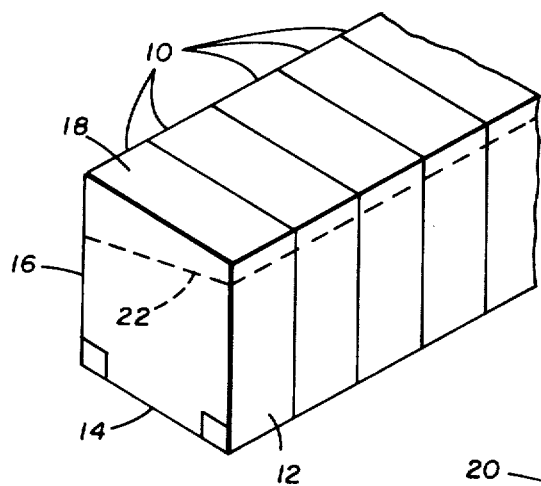
FIG. 1 is a view of a plurality of facet blocks prior to cutting one surface thereof.
Figure 2:
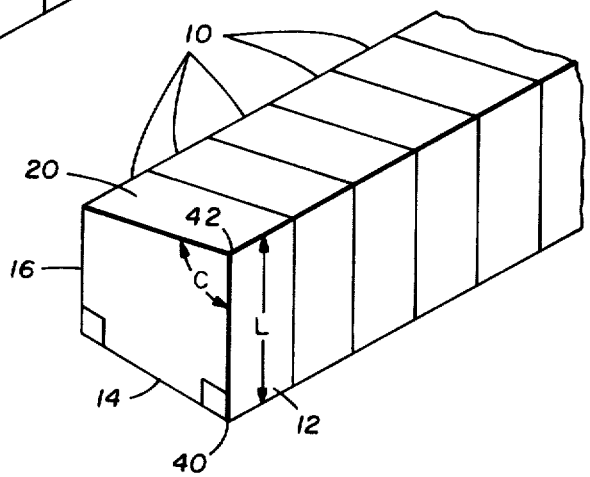
FIG. 2 is a view of the plurality of facet blocks of FIG. 1 subsequent to cutting the same.

Referring to FIG. 1, a plurality of rectangular steel blocks 10, each having four edges 12, 14, 16 and 18, are illustrated in stacked alignment. A portion of the edge 12 of each block will become a facet of a rotating polygon scanner. The stack of blocks is placed on a fixture (not shown), and the blocks are simultaneously cut to form a new surface 20 along cut line 22. Referring to FIG. 2, the length "L" of the facet edge 12 and the angle of surface 20 relative to the facet edge 12 will depend upon the radius of the polygon as well as the number of facets desired. This will be described hereinafter.

Figure 3:
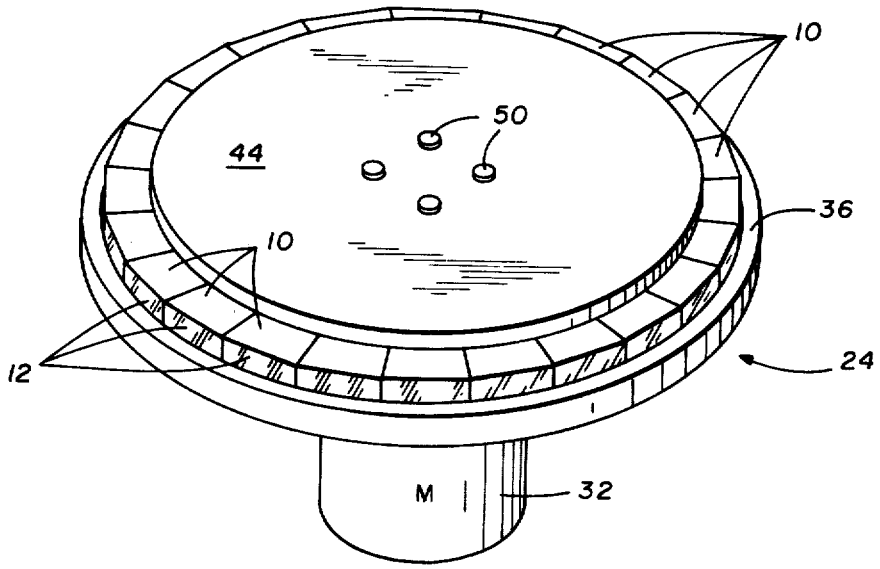
FIG. 3 is a perspective view of a polygon assembly.
Figure 4:
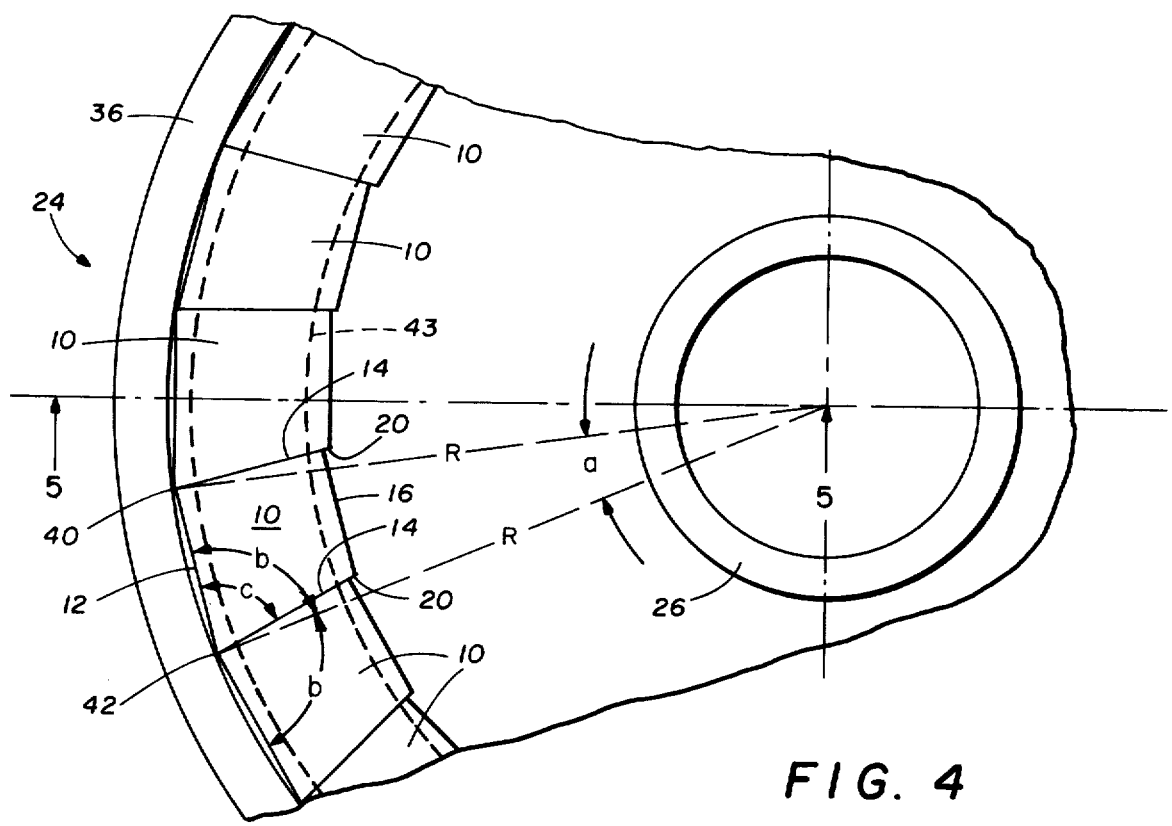
FIG. 4 is a partial top view of the polygon assembly of FIG. 3 cut away to expose separate facet blocks in assembled position.
Figure 5:
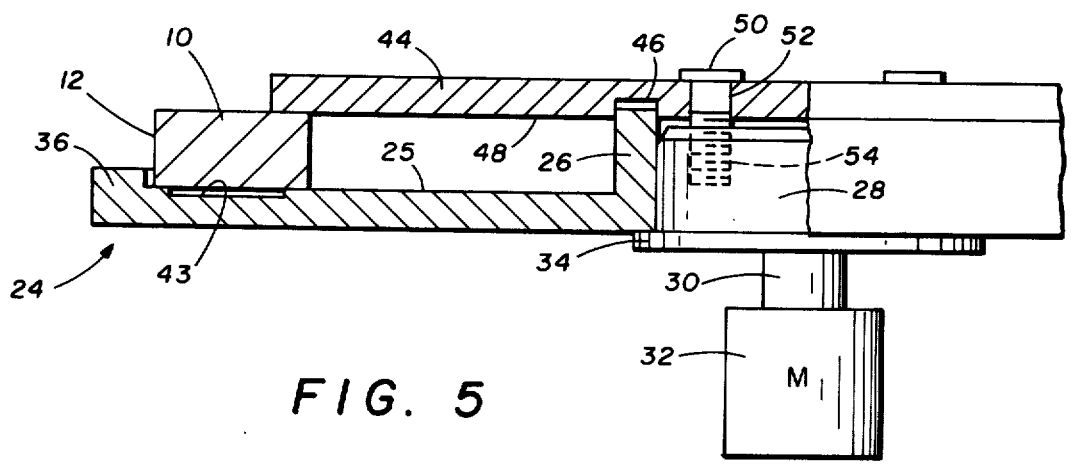
FIG. 5 is a view taken along section line 5—5 of FIG. 4.

Referring to FIGS. 3–5, a circular support platform 24 comprises a generally planar upper surface 25 and at the inner periphery thereof is an annular collar 26 extending upwards therefrom which slides over a cylindrical hub 28. The hub 28 is secured to a shaft 30 which, in turn, is secured to a motor 32 for rotation. An annular flange 34 is located at the bottom of the hub 28 and serves as a stop abutment for the bottom of collar 26. At the outer periphery of the platform 24 is located an annular lip 36 extending upwards from the upper surface 25 of the platform. The inner radius R of the lip 36 is designed to receive a given number of blocks arranged with edges 14 and 20 in abutting relationship as the facets thereof form successive chords across the lip 36.

It is much simpler to machine right-angle corners than to machine corners of other angles. Therefore, each block is square or rectangular to start with and only one cut needs to be performed. Accordingly, edges 14 and 16 are at right angles to each other and edge 14 is at a right angle to facet 12. The angle $c$ of edge 20 relative to the facet 12 is determined as follows:

Let $N$ = number of facets

Let $a$ = the radial angle subtended by each facet

Let $R$ = the radius of the lip 36

Let $b$ = the angle between the radius R and the facet when the radius is located at each corner 40 and 42 of the block 10

Let $c$ = the angle between the edge 20 of each block and the facet 12 on the same block 1. $a = (360°/N)$ 2. $2b = 180° - a$ 3. $2b = 90° + c$ 4. $c = 2b - 90°$ Substituting equation (2) for $2b$ in equation (4):
5. $c = (180° - a) - 90°$ Substituting equation (1) for $a$ in equation (5):

$c = 90° - (360°/N)$

The dimensions of the blocks are such that there is a tight but not a forced fit between the blocks. The fit is such that upon rotation of the platform 24, the blocks are free to move outwardly under centrifugal force until the corners 40 and 42 of each block engage the lip 36, thereby assuring such position of each block.

An annular shallow groove 43 is located in the upper surface 25 across which the facet blocks 10 span. The width of the groove is substantial compared to the distance between edge 16 and facet 12 (approximately 80%). The purpose of the groove is to decrease the area of surface on which the blocks 10 rest to substantially reduce the effects of an imperfect surface 25 on the blocks 10, which may tend to tilt each block and increase the angle tolerances between the facets 12.

A generally planar plate 44 has an annular recess 46, which receives the upper end of the collar 26 therein and has a planar bottom surface 48, which overlies and engages a portion of the upper surface of the blocks 10 to hold the same against the platform 24 during rotation. A plurality of screws 50 extend through openings 52 in the center portion of the upper plate 44 and into threaded openings 54 in the hub 28 to secure the plate 44 and thereby the platform 24 to the hub 28 for rotation therewith.

Each facet surface 12 is polished and coated to provide a highly reflective surface. This procedure is well known in the polygon scanner manufacturing art.

The above-described construction is a preferred construction. However, the basic principle of this invention can be carried out by varying the angle of the intersection of edges 14 and 20 with the facet 12 of each block while maintaining a substantial contact between adjacent edges of each block. However, one would lose the benefit of right angled corners.

Figure 6:
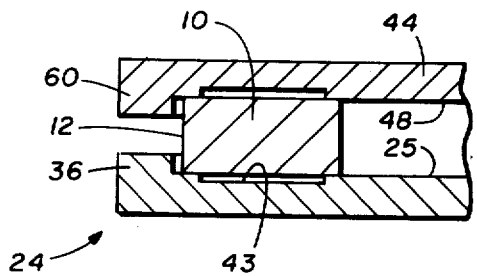
FIG. 6 is a partial view similar to FIG. 5, only of a modified polygon assembly of FIG. 3.

Also, the plate 44 can be modified as shown in FIG. 6 by extending the radius of the same and providing an annular lip 60 against which the corners 40 and 42 of the blocks will also abut.

Thus, it can be seen that a polygon can be provided with a simple cutting step and simple assembly steps. Tolerances can be substantially reduced with this procedure when compared with cutting facets on one piece to form a polygon.

What is claimed is:

1. A scanning polygon comprising an upper plate and a lower plate, each having an inner surface; a plurality of identical blocks located between said plates and each having an upper surface engaging said upper plate, a lower surface engaging said lower plate and first, second and third side edges joining said upper and lower surfaces; said first and second side edges intersecting said third side edge to form respective corners therewith; said third edge being a highly reflective facet; an annular lip extending from the inner surface of at least one of said plates towards the other of said plates; the height of said lip beyond said inner surface being substantially less than the thickness of said facet edge; said blocks being arranged in such a manner that said first edge of one block abuts said second edge of the block adjacent thereto, and said corners of each block engages said lip whereby said facet edges of each block form chords along the lip to form a polygon; the angle of the corner formed by said first edge and said facet being substantially 90°; and the angle of the corner formed by said second edge and said facet being substantially 90° − (360°/$N$) where $N$ is the number of facets forming the polygon.

2. The structure as recited in claim 1 wherein one said annular lip extends from the lower plate.

3. The structure as recited in claim 1 wherein both of said plates have annular lips extending toward one another and being engaged by the corners of said blocks, the combined height of said lips being substantially less than said facet thickness.

4. A scanning polygon comprising an upper plate and a lower plate, each having an inner surface; a plurality of identical blocks located between said plates and each having an upper surface engaging said upper plate, a lower surface engaging said lower plate and first, second and third side edges joining said upper and lower surfaces; said first and second side edges intersecting said third side edge to form respective corners therewith; said third edge being a highly reflective facet; an annular lip extending from the inner surface of at least one of said plates towards the other of said plates; the height of said lip beyond said inner surface being substantially less than the thickness of said facet edge; said blocks being arranged in such a manner that said first edge of one block abuts said second edge of the block adjacent thereto, and said corners of each block engage said lip whereby said facet edges of each block form chords along the lip to form a polygon; an annular groove in said inner surface of at least one of said plates, each of said blocks spanning said groove, the radial width of said groove being of substantial dimension compared to the radial width of said blocks.

5. The structure as recited in claim 4 wherein one said annular lip is on the lower plate.

6. The structure as recited in claim 4 wherein one said plate with one said groove is the lower plate.

7. The structure as recited in claim 4 wherein each plate has said annular lip extending towards each other and being engaged by the corners of said blocks, the combined height of said lips being substantially less than said facet thickness; and each plate has said annular groove in said inner surface thereof.

8. The structure as recited in claim 4 wherein each plate has said annular groove in said inner surface thereof.

9. The structure as recited in claim 4 wherein the angle of the corner formed by said first edge and said facet is substantially 90° and the angle of the corner formed by said second edge and said facet is substantially 90° − (360°/$N$) where $N$ is the number of facets forming the polygon.

* * * * *